(12) United States Patent
Ramachandran et al.

(10) Patent No.: US 9,014,421 B2
(45) Date of Patent: Apr. 21, 2015

(54) FRAMEWORK FOR REFERENCE-FREE DRIFT-CORRECTED PLANAR TRACKING USING LUCAS-KANADE OPTICAL FLOW

(75) Inventors: Mahesh Ramachandran, San Diego, CA (US); Ashwin Swaminathan, San Diego, CA (US); Murali R. Chari, San Diego, CA (US); Serafin Diaz Spindola, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 723 days.

(21) Appl. No.: 13/247,939

(22) Filed: Sep. 28, 2011

(65) Prior Publication Data

US 2013/0076915 A1 Mar. 28, 2013

(51) Int. Cl.
*G06T 7/20* (2006.01)
(52) U.S. Cl.
CPC ............ *G06T 7/2066* (2013.01); *G06T 7/2073* (2013.01); *G06T 2207/10016* (2013.01); *G06T 2207/20016* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 7,548,659 B2 * | 6/2009 | Ofek et al. | 382/254 |
| 2006/0204040 A1 * | 9/2006 | Freeman et al. | 382/107 |
| 2006/0257042 A1 * | 11/2006 | Ofek et al. | 382/255 |
| 2008/0117168 A1 * | 5/2008 | Liu et al. | 345/158 |
| 2009/0010507 A1 | 1/2009 | Geng | |
| 2009/0028403 A1 * | 1/2009 | Bar-Aviv et al. | 382/128 |
| 2009/0079854 A1 * | 3/2009 | Mangoubi et al. | 348/251 |
| 2009/0168887 A1 * | 7/2009 | Lin | 375/240.16 |
| 2010/0232643 A1 | 9/2010 | Chen et al. | |
| 2010/0309225 A1 | 12/2010 | Gray et al. | |
| 2011/0133917 A1 * | 6/2011 | Zeng | 340/436 |
| 2012/0105654 A1 * | 5/2012 | Kwatra et al. | 348/208.4 |
| 2012/0140061 A1 * | 6/2012 | Zeng | 348/135 |

OTHER PUBLICATIONS

International Search Report and Written Opinion—PCT/US2012/051739—ISA/EPO—Mar. 1, 2013.
J. Mooser et al., "Real-Time Object Tracking for Augmented Reality Combining Graph Cuts and Optical Flow", in International Symposium on Mixed and Augmented Reality, pp. 145-152, Nov. 2007.
S. Baker et al., "Lucas-Kanade 20 Years On: A Unifying Framework", International Journal of Computer Vision, 56(3), pp. 221-255, 2004.
J. Shi et al., "Good Features to Track", 1994 IEEE Conference on Computer Vision and Pattern Recognition (CVPR'94), 1994, pp. 593-600.

(Continued)

*Primary Examiner* — Tsung-Yin Tsai
(74) *Attorney, Agent, or Firm* — Silicon Valley Patent Group LLP

(57) ABSTRACT

Reference free tracking of position by a mobile platform is performed using images of a planar surface. Tracking is performed optical flow techniques, such as pyramidal Lucas-Kanade optical flow with multiple levels of resolution, where displacement is determined with pixel accuracy at lower resolutions and at sub-pixel accuracy at full resolution, which improves computation time for real time performance. Periodic drift correction is performed by matching features between a current frame and a keyframe. The keyframe may be replaced with the drift corrected current image.

20 Claims, 5 Drawing Sheets

(56) References Cited

OTHER PUBLICATIONS

Jeann-yves Bouguet, "Pyramidal implementation of the Lucas Kanade feature tracker", Intel Corporation, Microprocessor Research Labs (2000), 9 pages.

B. Lucas et al., "An Iterative Image Registration Technique with an Application to Stereo Vision", Proceedings of the 7th International Joint Conference on Artificial Intelligence (IJCAI '81), pp. 674-679, 1981.

Partial International Search Report—PCT/US2012/051739—ISA/EPO—Dec. 6, 2012.

Robert Hegner, "Efficient Implementation and Evaluation of Methods for the Estimation of Motion in Image Sequences, Master Thesis", Jun. 13, 2010. XP002687825, Retrieved from the Internet: URL:http://brage.bibsys.no/uis/bitstream/URN:NBN:no-bibsys_brage_13871/1/Hegner,%20Robert. pdf [retrieved on Nov. 22, 2012] pp. 33-36.

\* cited by examiner

FRAMEWORK FOR REFERENCE-FREE DRIFT-CORRECTED PLANAR TRACKING USING LUCAS-KANADE OPTICAL FLOW

BACKGROUND

In augmented reality, continuous tracking of a planar target in a robust fashion is of prime importance. The prevalent framework for achieving that is to use a reference image to match with each incoming frame of the video. However, this assumes the availability of a good high-resolution reference image. Reference-denied situations occur in several use cases, e.g., in augmented reality applications, and there is a need for a robust system in such cases.

SUMMARY

Reference free tracking of position by a mobile platform is performed using images of a planar surface. Tracking is performed using optical flow techniques, such as pyramidal Lucas-Kanade optical flow with multiple levels of resolution, where displacement is determined with pixel accuracy at lower resolutions and at sub-pixel accuracy at full resolution, which improves computation time for real time performance. Periodic drift correction is performed by matching features between a current frame and a keyframe. The keyframe may be replaced with the drift corrected current image.

In one implementation, a method includes performing a pyramidal Lucas-Kanade optical flow on a first image frame and a second image frame using multiple levels including a full resolution level and at least one partial resolution level. The pyramidal Lucas-Kanade optical flow includes determining a displacement between the first image frame and the second image frame to a nearest pixel in the at least one partial resolution level; and refining the displacement using subpixel displacements only at the full resolution level.

In another implementation, an apparatus includes a camera for capturing a first image frame and a second image frame of an environment and a processor coupled to the camera for receiving the first image frame and the second image frame of the environment. The processor is adapted to perform a pyramidal Lucas-Kanade optical flow on the first image frame and the second image frame using multiple levels including a full resolution level and at least one partial resolution level, the processor being adapted to perform the pyramidal Lucas-Kanade optical flow by being adapted to determine a displacement between the first image frame and the second image frame to a nearest pixel in the at least one partial resolution level and to refine the displacement using subpixel displacements only at the full resolution level.

In another implementation, an apparatus includes means for performing a pyramidal Lucas-Kanade optical flow on a first image frame and a second image frame using multiple levels including a full resolution level and at least one partial resolution level. The means for performing the pyramidal Lucas-Kanade optical flow includes means for determining a displacement between the first image frame and the second image frame to a nearest pixel in the at least one partial resolution level; and means for refining the displacement using subpixel displacements only at the full resolution level.

In yet another implementation, a non-transitory computer-readable medium including program code stored thereon, includes program code to perform a pyramidal Lucas-Kanade optical flow on a first image frame and a second image frame received from a camera using multiple levels including a full resolution level and at least one partial resolution level. The program code to perform the pyramidal Lucas-Kanade optical flow includes program code to determine a displacement between the first image frame and the second image frame to a nearest pixel in the at least one partial resolution level; and program code to refine the displacement using subpixel displacements only at the full resolution level.

In another implementation, a method of tracking a position of a mobile platform includes capturing a series of images of a planar surface using the mobile platform; comparing each image against a preceding image to determine a position of mobile platform; determining whether to perform drift correction by comparing each image to a keyframe image, wherein the keyframe image precedes the preceding image; performing drift correction on a current image; and replacing the keyframe image with the current image.

In another implementation, a mobile platform includes a camera for capturing a series of images of a planar surface and a processor coupled to the camera for receiving the series of images of the planar surface. The processor is adapted to compare each image against a preceding image to determine a position of the mobile platform, to determine whether to perform drift correction by comparing each image to a keyframe image, wherein the keyframe image precedes the preceding image, to perform drift correction on a current image, and to replace the keyframe image with the current image.

In another implementation, a mobile platform includes means for capturing a series of images of a planar surface; means for comparing each image against a preceding image to determine a position of the mobile platform; means for determining whether to perform drift correction by comparing each image to a keyframe image, wherein the keyframe image precedes the preceding image; means for performing drift correction on a current image; and means for replacing the keyframe image with the current image.

In yet another implementation, a non-transitory computer-readable medium including program code stored thereon includes program code to compare each image in a received series of images of a planar surface against a preceding image to determine a position of a camera; program code to determine whether to perform drift correction by comparing each image to a keyframe image, wherein the keyframe image precedes the preceding image; program code to perform drift correction on a current image; and program code to replace the keyframe image with the current image.

DETAILED DESCRIPTION

Figure 1:
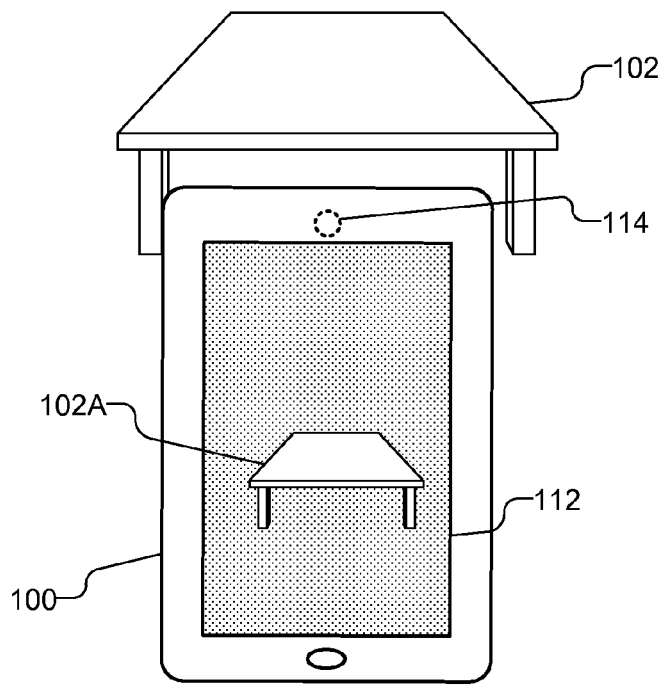
FIG. 1 illustrates a mobile platform that can perform reference free tracking of position by imaging a planar surface.

FIG. 1 illustrates a mobile platform 100 that can perform reference free tracking of position by imaging a planar surface. The mobile platform 100 may be any portable electronic device such as a cellular or other wireless communication device, personal communication system (PCS) device, personal navigation device (PND), Personal Information Manager (PIM), Personal Digital Assistant (PDA), laptop, camera, or other suitable mobile device that is capable of capturing images and positioning and tracking.

The mobile platform 100 captures an image with a camera 114 of a planar object 102, which is illustrated in FIG. 1 as a table. It should be understood that as used herein, a captured image may be a single image, e.g., a photo or a frame of video captured by the camera 114. The object 102 is displayed in the display 112 of the mobile platform 100 as the image 102A. With reference free tracking, the position and orientation, i.e., pose, of the mobile platform 100 with respect to the object 102 is determined using optical flow. Optical flow is the measurement of motion vectors of pixels in an image sequence and thus compares a most recently captured image to a preceding captured image (e.g., immediately preceding image in the sequence) to determine the incremental change in position and orientation. Sparse feature optical flow leads to feature tracking of interest points and point correspondences.

One technique that may be used for optical flow is Lucas Kanade optical flow. The Lucas Kanade method is a two-frame differential method for optical flow estimation that uses image gradients and an iterative approach to solve motion parameters. Lucas-Kanade may solve parameters of higher motion models, such as perspective and affine by minimizing a quadratic functional by solving a linear system in each iteration. The Lucas-Kanade optical flow is computationally intensive and is too slow for real time performance. Real time performance is necessary for applications such as augmented reality or other applications that may be used by mobile platform 100.

Figure 2:
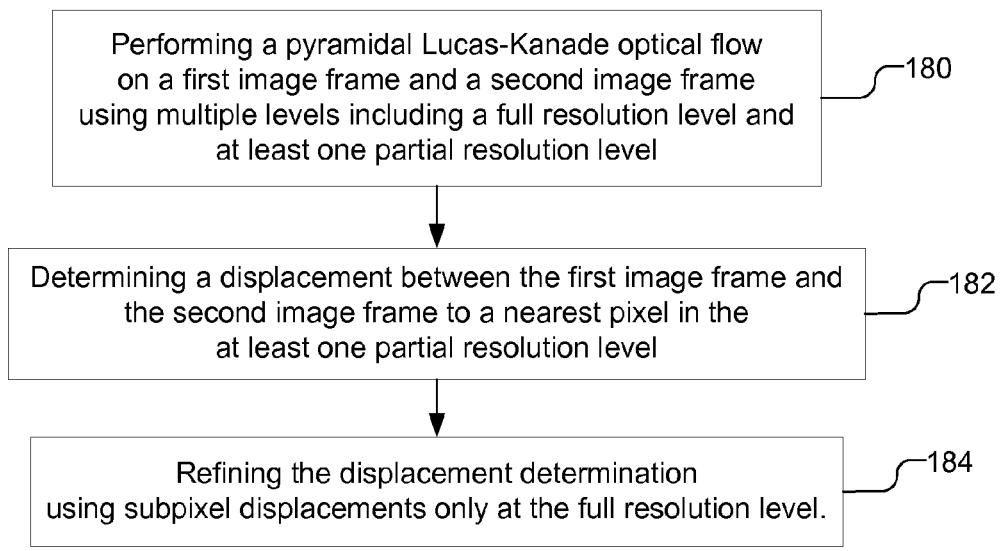
FIG. 2 is a flow chart illustrating the modified pyramidal Lucas-Kanade optical flow method.

Accordingly, mobile platform 100 uses a modified pyramidal Lucas-Kanade optical flow method, which reduces the computation time to provide real time performance. FIG. 2 is a flow chart illustrating the modified pyramidal Lucas-Kanade optical flow method. As can be seen, the pyramidal Lucas-Kanade optical flow is performed on a first image frame and a second image frame using multiple levels including a full resolution level and at least one partial resolution level (180). The pyramidal Lucas-Kanade optical flow includes determining a displacement between the first image frame and the second image frame to a nearest pixel in the at least one partial resolution level (182). The displacement determination is refined using subpixel displacements at the full resolution level (184).

Figure 3:
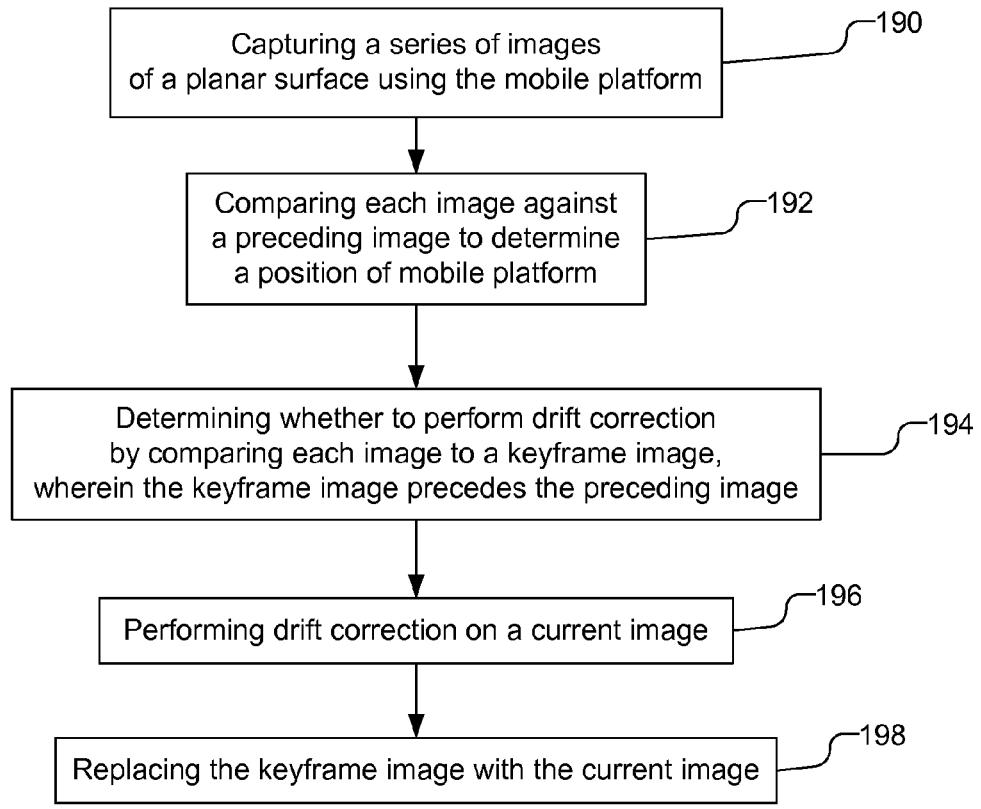
FIG. 3 is a flow chart illustrating a method of tracking a position of a mobile platform in which drift correction is performed.

Another difficulty experienced with optical flow techniques, such as Lucas-Kanade or Normalized Cross Correlation, is drift of features due to appearance change and error buildup. Accordingly, mobile platform 100 may perform drift correction by matching features between a current frame and a keyframe that are widely separated. FIG. 3 is a flow chart illustrating a method of tracking a position of a mobile platform in which drift correction is performed. As can be seen, a series of images of a planar surface are captured using a mobile platform (190). Each image is compared to a preceding image to determine a position of mobile platform (192), e.g., Lucas-Kanade optical flow method or other methods, such as Normalized Cross Correlation. The method then determines whether to perform drift correction by comparing each image to a keyframe image, wherein the keyframe image precedes the preceding image (194). Drift correction is performed on the current image (196) and the keyframe image is replaced with the current image (198). Drift correction may be performed, e.g., using Lucas-Kanade affine tracking or Normalized Cross Correlation with affine motion model.

Figure 4:
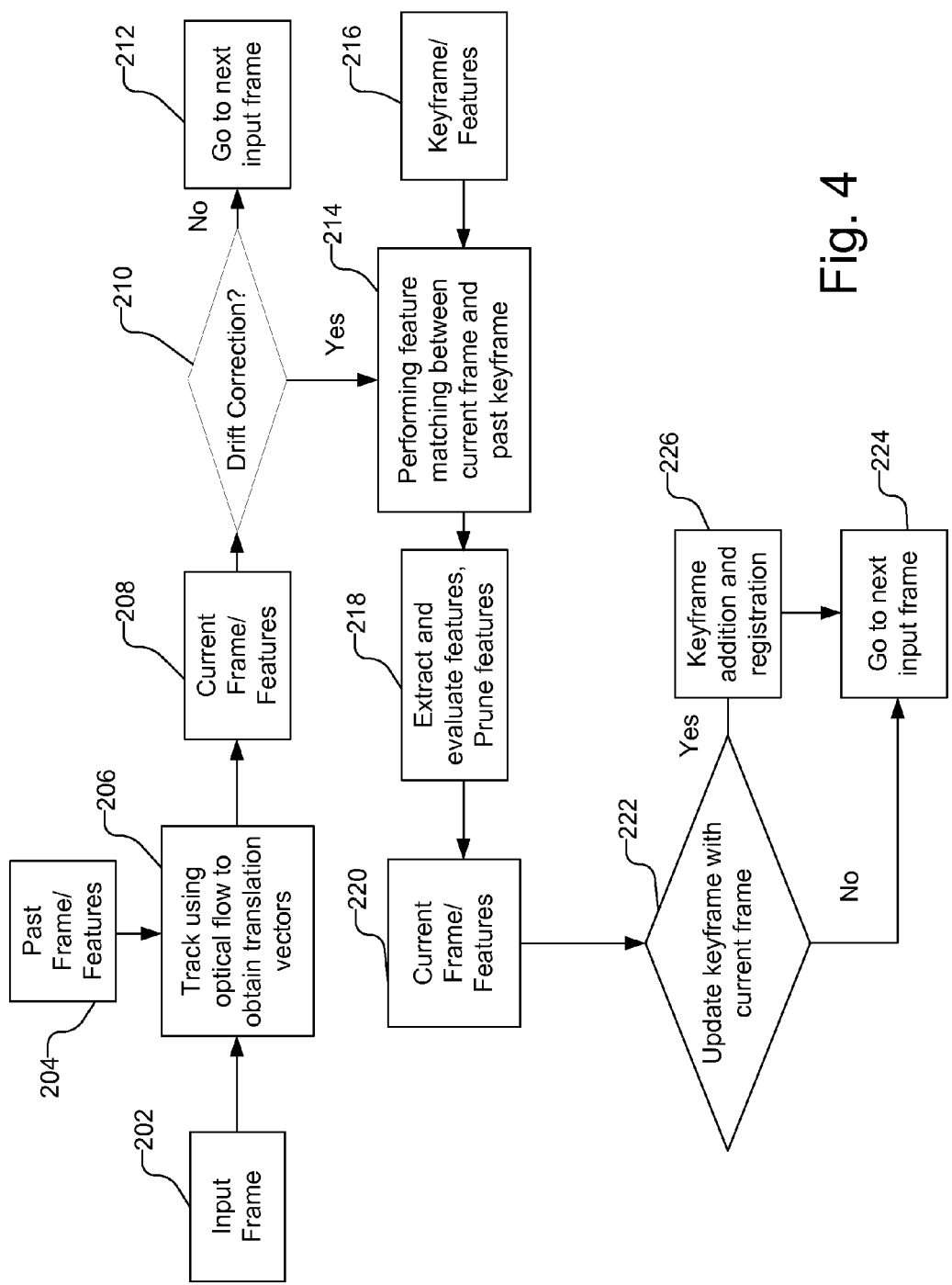
FIG. 4 is a flow chart illustrating a method of reference free tracking from imaging a planar surface, which may be performed by mobile platform.

FIG. 4 is a flow chart illustrating a method of reference free tracking from imaging a planar surface, which may be performed by mobile platform 100. In general, as illustrated in FIG. 4, a series of images of a planar surface are captured using a mobile platform. Each newly captured image in provided as input frame (202), while a previously captured image, which may be the immediately preceding image, along with extracted features from the past frame are provided as past frame (204).

The input frame (202) is compared to the past frame (204) to track the position of the mobile platform 100 (206). Tracking may be performed using optical flow methods, such as Lucas-Kanade tracking, Normalized Cross Correlation or other techniques that are suitable for real-time determination of pose. For example, a pyramidal Lucas-Kanade optical flow process may be used in a modified form to reduce computation time, which is necessary for real-time tracking. Pyramidal Lucas-Kanade optical flow is known to those skilled in the art and is described, e.g., by Jean-yves Bouguet, "Pyramidal implementation of the Lucas Kanade feature tracker", Intel Corporation, Microprocessor Research Labs (2000), 9 pages, and Simon Baker and Iaian Matthews, "Lucas-Kanade 20 Years On: A Unifying Framework", International Journal of Computer Vision, Vol. 56, No. 3, (2004), pp. 221-255, both of which are incorporated herein by reference.

Figure 5:
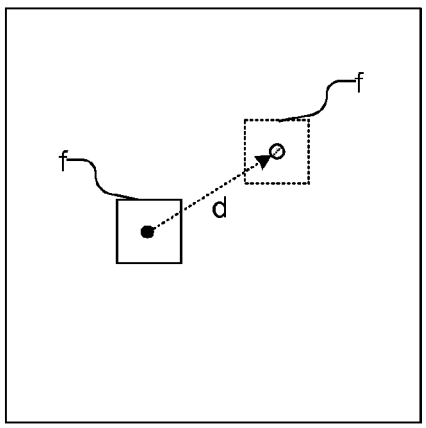
FIG. 5 illustrates a feature point, surrounded by a feature window that moves by displacement from a first image to a subsequent image.

The Lucas Kanade algorithm, in general, is a two-frame differential method for determining optical flow, in which a matching function for pixel displacement between the two images is minimized. FIG. 5, by way of example, illustrates a feature point f, surrounded by a feature window of size w×w, that moves by displacement d (i.e., $(d_x, d_y)$), from a first image I to a subsequent image J, i.e., the current image, which is illustrated with the dotted lines. The feature point is distinguished from the surrounding pixels and the appearance of the interest point is described by the feature patch. A brightness constancy assumption used to search for feature patch (x,y) is that at the correct displacement $(d_x, d_y)$ the following is small:

$$\sum_{u=x-w}^{x+w} \sum_{v=y-w}^{y+w} (I(u, v) - J(u + d_x, v + d_y))^2. \qquad \text{eq. 1}$$

The displacement d is solved by minimizing equation 1, where N(f) is the feature window of size w×w around feature point f.

$$\arg\min_{(d_x, d_y)} \sum_{(x,y) \in N(f)} \sum (I(x, y) - J(x + d_x, y + d_y))^2 \qquad \text{eq. 2}$$

Assuming a small refinement $(\delta_x, \delta_y)$ of the current displacement $(d_x, d_y)$ to get $(d_x+\delta_x, d_y+\delta_y)$ and expanding in Taylor series produces $$\arg\min_{(\delta_x,\delta_y)} \sum_{(x,y)\in N(f)} \sum (I(x-\delta_x, y-\delta_y) - J(x+d_x, y+d_y))^2 \equiv \quad \text{eq. 3}$$

$$\arg\min_{(\delta_x,\delta_y)} \sum_{(x,y)\in N(f)} \sum (I(x,y) - J(x+d_x, y+d_y) - \nabla I \cdot \delta)^2 \quad 5$$

$$\delta = G^{-1}b$$

$$G = \sum\sum \begin{bmatrix} I_x^2 & I_xI_y \\ I_xI_y & I_y^2 \end{bmatrix}$$

$$b = \sum\sum \begin{bmatrix} I_x \cdot (I-J) \\ I_y \cdot (I-J) \end{bmatrix}$$

A pyramid based optical flow allows for searching over a larger effective window. Thus, a pyramidal implementation of the classical Lucas-Kanade algorithm may be used, which is an iterative implementation of the Lucas-Kanade optical flow. A pyramid representation of an image includes a number of pyramid levels, with the highest pyramid level representing the highest resolution image, i.e., the full resolution or raw image, and the lowest pyramid level representing the lowest resolution of the image. For example, with an image with a size of 640×480 pixels, four pyramid levels, from highest to lowest, may have sizes 320×240, 160×120, 80×60, and 40×30. Typically the use of four pyramid levels is adequate, but additional or fewer levels may be used if desired.

In a pyramidal implementation, the optical flow is computed at the lowest pyramid level, i.e., the matching function for pixel displacement is minimized at the lowest resolution image. The results from each lower pyramid level are propagated to the next higher pyramid level as an initial guess for the pixel displacement. The optical flow is recomputed at each higher pyramid level based on the initial guess provided by the lower pyramid level.

Figure 6:
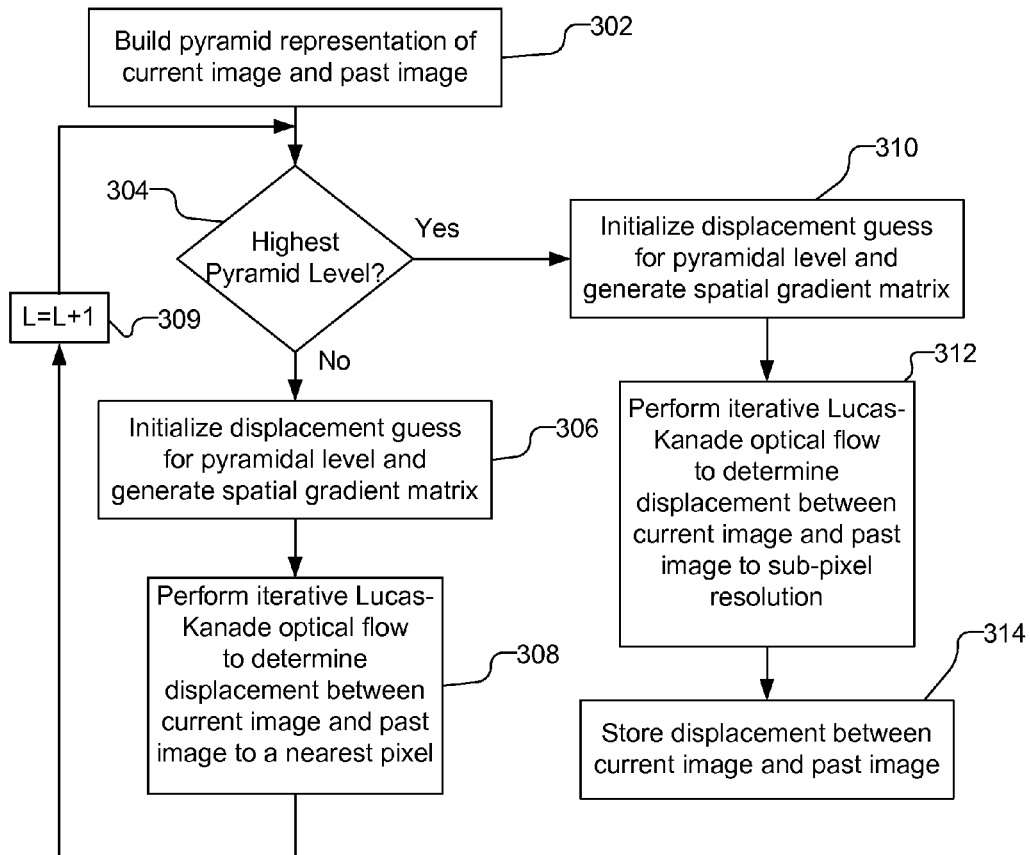
FIG. 6 is a flow chart illustrating the pyramidal Lucas-Kanade optical flow method performed by the mobile platform.

FIG. 6 is a flow chart illustrating the pyramidal Lucas-Kanade optical flow method performed by the mobile platform 100 at step 206 in FIG. 4. As illustrated in FIG. 6, a pyramid representation of the current image and the past image is built (302), with multiple levels L of differing resolution of the images. If desired, the pyramid representation of the past image may be previously built and thus need not be regenerated. The pyramid representations are constructed by low pass filtering and downsampling and the corresponding gradient images are computed.

If the current pyramid level L is not the highest pyramid level (304), an iterative Lucas-Kanade optical flow will be performed to determine displacement between the current image and the past image to a nearest pixel (308). In other words, the displacement between the current image and the past image is determined at an integer number of pixels. If the current pyramid level L is the highest pyramid level (304), i.e., the level has the greatest resolution, an iterative Lucas-Kanade optical flow will performed to determine displacement between the current image and the past image to sub-pixel resolution (312).

As illustrated in FIG. 6, if the current pyramid level L is not the highest pyramid level (304), a displacement guess g for the current pyramid level L is initialized (306) and a spatial gradient matrix for the pyramid level is determined (306). For example, the initial displacement guess g between the current image and past image at the lowest pyramid level may be zero, i.e., $[g_x, g_y]=[0, 0]$. Alternatively, the initial displacement guess g for the lowest level may be based on one or more displacement determinations made for previous images. The displacement guess g for higher pyramid levels is based on the displacement results from lower pyramid levels. For each pyramid level L, the spatial gradient matrix G is determined as follows:

$$G = \sum_{x=p_x-\omega_x}^{p_x+\omega_x} \sum_{y=p_y-\omega_y}^{p_y+\omega_y} \begin{bmatrix} I_x^2(x,y) & I_x(x,y)I_y(x,y) \\ I_x(x,y)I_y(x,y) & I_y^2(x,y) \end{bmatrix}. \quad \text{eq. 4}$$

If desired, the spatial gradient matrix G for all levels may be precomputed, e.g., when the pyramid representation is built, i.e., step 302. The use of the inverse compositional trick leads to a constant spatial gradient matrix.

The iterative Lucas Kanade optical flow process with a resolution to the nearest pixel is then performed (308). The iterative Lucas Kanade optical flow process includes generating an initial displacement guess v for the current iteration k. For the initial iteration at the current pyramid level, the displacement guess v may be initialized as $[v_x, v_y]=[0, 0]$. The displacement guess v for later iterations is based on the results from preceding iterations. For each iteration k, from k=1 to K, or until a termination criteria is met, the image difference is determined as:

$$\delta I_k(x,y) = I(x,y) - J(x+g_x+v_x, y+g_y+v_y). \quad \text{eq. 5}$$

The image difference error is then determined as:

$$\overline{b_k} = \sum_{x=p_x-\omega_x}^{p_x+\omega_x} \sum_{y=p_y-\omega_y}^{p_y+\omega_y} \begin{bmatrix} \delta I_k(x,y)I_x(x,y) \\ \delta I_k(x,y)I_y(x,y) \end{bmatrix}. \quad \text{eq. 6}$$

The image difference error $\overline{b}_k$ in equation 6 is rounded to the nearest pixel during the iterative Lucas-Kanade optical flow of step 308, but is interpolated to sub-pixel resolution during the iterative Lucas-Kanade optical flow of step 312.

The Lucas Kanade optical flow is then performed as:

$$\overline{\eta}^k = G^{-1}\overline{b}_k. \quad \text{eq. 7}$$

The next iteration guess can then be determined as:

$$\overline{v}^{k+1} = \overline{v}^k + \overline{\eta}^k. \quad \text{eq. 8}$$

Once the iterations k for the iterative Lucas Kanade optical flow end, e.g., k=K or a termination criteria is met, the displacement d for the current pyramid level L is determined as:

$$d^L = \overline{v}^K. \quad \text{eq. 9}$$

As illustrated in FIG. 6, the process then updates the pyramid level L=L+1 (309) and the iterative process is repeated for each pyramid level L $(p_x, p_y) \leftarrow (p_x, p_y)*2$. The displacement guess g (306) for subsequent iterations can be generated as:

$$g^L = 2(g^{L-1} + d^{L-1}). \quad \text{eq. 10}$$

The iterative process continues until the highest pyramid level is reached (304). At the highest pyramid level, the initial displacement guess g is determined as per equation 10 and the spatial gradient matrix is generated (310) if it was not generated earlier, i.e., at step 302. The iterative Lucas-Kanade optical flow is then performed as described above except that displacement between the current image and the past image is determined to sub-pixel resolution (312) and the resulting sub-pixel resolution is stored (314), e.g., in memory of the mobile platform 100 to be used for tracking. To determine displacement at sub-pixel resolution at step 312, an interpolation, such as bilinear or bicubic, may be used to determine the image difference error k in equation 6.

Figure 7:
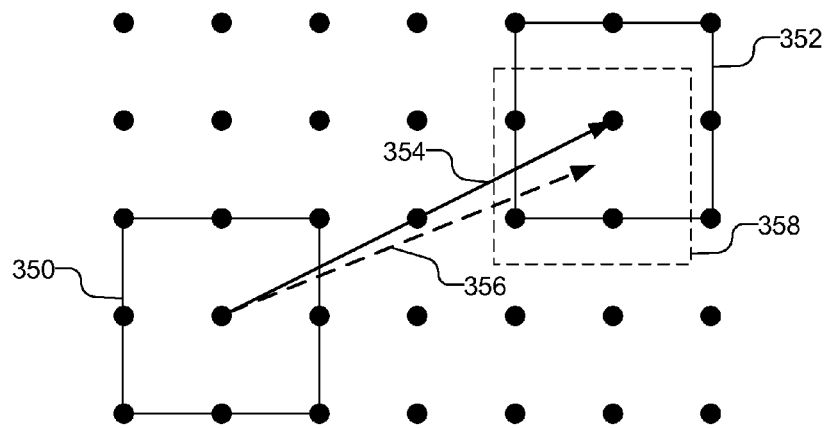
FIG. 7 illustrates integer pixel and sub-pixel displacement resolution as produced by the Lucas Kanade optical flow.

FIG. 7 illustrates integer pixel and sub-pixel displacement resolution as produced by the Lucas Kanade optical flow of steps 308 and 312, respectively. FIG. 7 illustrates an array of pixels, with a block 350 from the past image I and a best matching block 352 to integer pixel resolution in the current image J. The Lucas-Kanade optical flow process of step 308 provides a displacement vector 354 with integer pixel resolution between the two blocks 350 and 352. Using the Lucas-Kanade optical flow process of step 312, on the other hand, a sub-pixel resolution displacement vector 356 for matching block 358, shown with dashed lines, is generated.

By determining the displacement to the nearest pixel location, bilinear interpolation of the image and gradients is avoided and fewer Lucas-Kanade iterations k are necessary for convergence. While the maximum error is limited to 0.5 pixel, additional drift may be present resulting in less accurate tracking. However, accuracy is increased by using sub-pixel displacement at the highest pyramid level (step 312 in FIG. 6). By determining displacement to the nearest pixel location for all but the highest pyramid level, a 40%-45% decrease in computation time relative to a conventional system can be achieved, while achieving less than 1 pixel accuracy in 96.7% of cases.

The iterative Lucas-Kanade optical flow for each pyramid level is performed until convergence or until termination criteria is met. For example, it has been found that with pyramidal Lucas-Kanade, as described herein, convergence occurs within seven iterations. Thus, a maximum number of iterations, e.g., 7, may be set as a termination criteria. Additionally, a minimum displacement, e.g., 0.9 for integer pixel resolution and 0.2 for sub-pixel resolution, may be set as a termination criteria. Further, oscillation of the displacement over multiple iterations of the Lucas-Kanade optical flow, may be set as a termination criteria.

As discussed above, tracking using optical flow techniques suffers from drift due to appearance change and error buildup. Moreover, using nearest pixel displacement may result in additional drift. Accordingly, correction of drift, as described in FIG. 3, may be performed by matching features between a current frame to a keyframe.

Referring back to FIG. 4, after tracking (206) the current frame with extracted features (208) is provided and used to determine whether drift correction should be performed (210). One or more criteria may be used to determine when to correct drift. For example, one factor that may be used to determine whether drift correction should be performed is determining the keyframe image was greater than a predetermined number of image frames from the current image, e.g., drift correction may be performed if the keyframe image was more than 10 frames (or any other desired threshold) prior to the current frame. Another factor may be determining the frame quality of the current image is greater than a predetermined threshold. The frame quality may be obtained as each frame is captured using an image preprocessing to derive Video Front End (VFE) statistics. Other factors may be determining the number of features tracked in the current image is below a threshold, e.g., less than 35, or determining if the distance between tracked features in the keyframe image and the current image is statistically (e.g., mean or median) greater than a threshold, which may be empirically selected or based on parameter optimization. An additional factor may be determining if a distance between a first position of the mobile platform when the keyframe image was captured and a second position of the mobile platform when the current image was captured is greater than a predetermined threshold, as determined by the visual tracking. Another factor may be determining the change in pose between a first position of the mobile platform when the keyframe image was captured and a second position of the mobile platform when the current image was captured is greater than a predetermined threshold as determined based on the displacements of tracked features or from sensors such as accelerometers, gyroscopes, magnetometers, etc.

If no drift correction is necessary (210), the process goes to the next input frame (212). On the other hand, if drift correction is necessary (210), drift correction is performed by matching features (214) between the current frame and the keyframe (216). The feature matching (214) may be performed using, e.g., Lucas-Kanade affine tracking, e.g., as described by Jianbo Shi, et. al., in "Good Features to Track," Computer Vision and Pattern Recognition, 1994 pp. 593-600, which is incorporated herein by reference, or similarly Normalized Cross Correlation with affine motion model. The Lucas-Kanade affine tracking (or Normalized Cross Correlation affine tracking), corrects for the drift of features between the keyframe and the current frame. If desired, the current frame may be modified to correct for drift based on the feature matching, which may be useful for augmentation.

For affine tracking, a brightness constancy assumption is used to search for the feature patch (x,y), where the brightness constancy assumption is that the following is small at the correct displacement affine matrix A and displacement d:

$$\sum_{(x,y) \in N} \sum_{(f)} (I(x, y) - J(A_1 x + d_x, A_2 y + d_y))^2. \quad \text{eq. 11}$$

The displacement d is solved by minimizing equation 11, as illustrated below, where N(f) is the feature window of size w×w around feature point f, as described in "Good Features to Track" by Jianbo Shi.

$$\arg\min_{(A1,A2,dx,dy)} \sum_{(x,y) \in N} \sum_{(f)} (I(x, y) - J(A_1 x + d_x, A_2 y + d_y))^2 \quad \text{eq. 12}$$

After matching features from the current frame and past keyframe (214), features that have drifted are pruned (218). Additionally, new features are extracted and evaluated for tracking (218). The feature evaluation and pruning may be performed using conventional evaluation and pruning techniques. The current frame and features (220) may then be used as the past frame with features (204) for the next input frame (202). Additionally, a decision (222) is made whether to update the keyframe with the current frame with features (220). The decision (222) is based on whether the frame is of good quality based on VFE statistics and registration to past keyframes, i.e., the drift correction (214) was a success. If no update occurs, the process goes to the next input image (224), whereas if an update occurs, the current frame and features (220) is added as a keyframe (226) before going to the next input image (224).

Figure 8:
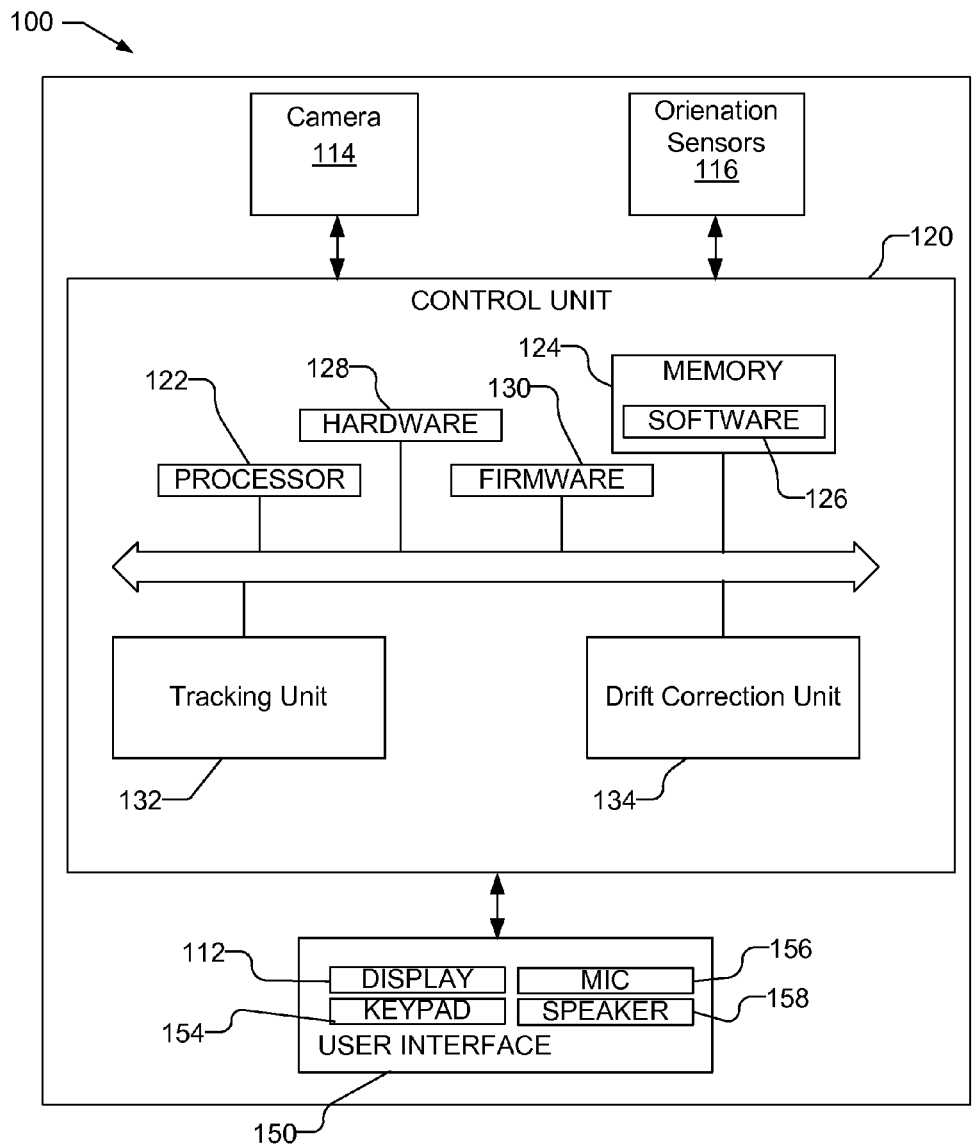
FIG. 8 illustrates a block diagram of a mobile platform capable of reference free tracking of position by imaging a planar surface as described herein.

FIG. 8 illustrates a block diagram of a mobile platform 100 capable of reference free tracking of position by imaging a planar surface as described herein. The mobile platform 100 is illustrated as including a camera 114 for capturing images of the environment, which may be either individual photos or frames of video. The mobile platform 100 may also include orientation sensors 116, which may be used to provide data with which the mobile platform 100 can determine its position and orientation, i.e., pose. Examples of orientation sensors that may be used with the mobile platform 100 include accelerometers, quartz sensors, gyros, or micro-electromechanical system (MEMS) sensors used as linear accelerometers, as well as magnetometers.

The mobile platform 100 may also include a user interface 150 that includes the display 112 capable of displaying images. The user interface 150 may also include a keypad 154 or other input device through which the user can input information into the mobile platform 100. If desired, the keypad 154 may be obviated by integrating a virtual keypad into the display 152 with a touch sensor. The user interface 150 may also include a microphone 156 and speaker 158, e.g., if the mobile platform is a cellular telephone. Of course, mobile platform 100 may include other elements unrelated to the present disclosure.

The mobile platform 100 also includes a control unit 120 that is connected to and communicates with the camera 114 and orientation sensors 116, as well as the user interface 150, along with any other desired features. The control unit 120 may be provided by a processor 122 and associated memory/storage 124, which may include software 126, as well as hardware 128, and firmware 130. The control unit 120 includes a tracking unit 132 for tracking the position of the mobile platform 100 with respect to a planar surface using optical flow, e.g., pyramidal Lucas-Kanade optical flow using pixel and sub-pixel resolution as described herein, or Normalized Cross-Correlation optical flow. The control unit 120 further includes drift correction unit 134 for correcting drift in a current image using a keyframe, as described herein. The tracking unit 132 and drift correction unit 134 are illustrated separately and separate from processor 122 for clarity, but may be a combined and/or implemented in the processor 122 based on instructions in the software 126 which is run in the processor 122.

It will be understood as used herein that the processor 122, as well as one or more of the tracking unit 132 and drift correction unit 134 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the terms "memory" and "storage" refers to any type of computer storage medium, including long term, short term, or other memory associated with the mobile platform, and is not to be limited to any particular type of memory or number of memories, or type of media upon which memory is stored.

The methodologies described herein may be implemented by various means depending upon the application. For example, these methodologies may be implemented in hardware 128, firmware 130, software 126, or any combination thereof. For a hardware implementation, the tracking unit 132 and drift correction unit 134 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 124 and executed by the processor 122. Memory may be implemented within or external to the processor 122.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
    performing a pyramidal Lucas-Kanade optical flow on a first image frame and a second image frame using multiple levels including a full resolution level and at least one partial resolution level, wherein the pyramidal Lucas-Kanade optical flow comprises:
        determining a displacement between the first image frame and the second image frame to a nearest pixel in the at least one partial resolution level; and
        refining the displacement using subpixel displacements only at the full resolution level.

2. The method of claim 1, wherein determining the displacement comprises performing iterations until one of a convergence and a termination criteria is met.

3. The method of claim 2, wherein the termination criteria comprises a maximum number of iterations, a minimum displacement, and oscillation of displacement.

4. The method of claim 1, wherein refining the displacement using subpixel displacements comprises performing one of bilinear interpolation and bicubic interpolation only at the full resolution level.

5. An apparatus comprising:
    a camera for capturing a first image frame and a second image frame of an environment;
    a processor coupled to the camera for receiving the first image frame and the second image frame of the environment, the processor is adapted to perform a pyramidal Lucas-Kanade optical flow on the first image frame and the second image frame using multiple levels including a full resolution level and at least one partial resolution level, the processor being adapted to perform the pyramidal Lucas-Kanade optical flow by being adapted to determine a displacement between the first image frame and the second image frame to a nearest pixel in the at least one partial resolution level and to refine the displacement using subpixel displacements only at the full resolution level.

6. The apparatus of claim 5, wherein the processor is adapted to determine the displacement by being adapted to perform iterations until one of a convergence and a termination criteria is met.

7. The apparatus of claim 6, wherein the termination criteria comprises a maximum number of iterations, a minimum displacement, and oscillation of displacement.

8. The apparatus of claim 5, wherein the processor is adapted to refine the displacement using subpixel displacements by being adapted to perform one of bilinear interpolation and bicubic interpolation only at the full resolution level.

9. An apparatus comprising:
  means for performing a pyramidal Lucas-Kanade optical flow on a first image frame and a second image frame using multiple levels including a full resolution level and at least one partial resolution level, wherein the means for performing the pyramidal Lucas-Kanade optical flow comprises:
    means for determining a displacement between the first image frame and the second image frame to a nearest pixel in the at least one partial resolution level; and
    means for refining the displacement using subpixel displacements only at the full resolution level.

10. The apparatus of claim 9, wherein the means for determining the displacement comprises means for performing iterations until one of a convergence and a termination criteria is met.

11. The apparatus of claim 10, wherein the termination criteria comprises a maximum number of iterations, a minimum displacement, and oscillation of displacement.

12. The apparatus of claim 9, wherein the means for refining the displacement using subpixel displacements comprises means for performing one of bilinear interpolation and bicubic interpolation only at the full resolution level.

13. A non-transitory computer-readable medium including program code stored thereon, comprising:
  program code to perform a pyramidal Lucas-Kanade optical flow on a first image frame and a second image frame received from a camera using multiple levels including a full resolution level and at least one partial resolution level, the program code to perform the pyramidal Lucas-Kanade optical flow comprising:
    program code to determine a displacement between the first image frame and the second image frame to a nearest pixel in the at least one partial resolution level; and
    program code to refine the displacement using subpixel displacements only at the full resolution level.

14. The non-transitory computer-readable medium of claim 13, wherein the program code to determine the displacement comprises program code to perform iterations until one of a convergence and a termination criteria is met.

15. The non-transitory computer-readable medium of claim 14, wherein the termination criteria comprises a maximum number of iterations, a minimum displacement, and oscillation of displacement.

16. The non-transitory computer-readable medium of claim 13, wherein the program code to refine the displacement using subpixel displacements comprises program code to perform one of bilinear interpolation and bicubic interpolation only at the full resolution level.

17. A method of tracking a position of a mobile platform, the method comprising:

capturing a series of images of a planar surface using the mobile platform;
  comparing each image against a preceding image to determine a position of mobile platform, wherein comparing each image against the preceding image to determine the position of mobile platform comprises determining motion in real-time using Lucas-Kanade optical flow, and wherein the Lucas-Kanade optical flow is a pyramidal Lucas-Kanade optical flow on a current image and the preceding image using multiple levels including a full resolution level and at least one partial resolution level, wherein the pyramidal Lucas-Kanade optical flow comprises:
    determining a displacement between the current image and the preceding image to a nearest pixel in the at least one partial resolution level; and
    refining the displacement using subpixel displacements only at the full resolution level;
  determining whether to perform drift correction by comparing each image to a keyframe image, wherein the keyframe image precedes the preceding image;
  performing drift correction on the current image; and
  replacing the keyframe image with the current image.

18. A mobile platform comprising:
  a camera for capturing a series of images of a planar surface;
  a processor coupled to the camera for receiving the series of images of the planar surface, the processor is adapted to compare each image against a preceding image to determine a position of the mobile platform, to determine whether to perform drift correction by comparing each image to a keyframe image, wherein the keyframe image precedes the preceding image, to perform drift correction on a current image, and to replace the keyframe image with the current image, wherein the processor is adapted to compare each image against the preceding image to determine the position of the mobile platform by being adapted to determine motion in real-time using Lucas-Kanade optical flow, and wherein the Lucas-Kanade optical flow is a pyramidal Lucas-Kanade optical flow on the current image and the preceding image using multiple levels including a full resolution level and at least one partial resolution level, wherein the processor is adapted to perform the pyramidal Lucas-Kanade optical flow by being adapted to determine a displacement between a first image frame and a second image frame to a nearest pixel in the at least one partial resolution level and to refine the displacement using subpixel displacements only at the full resolution level.

19. A mobile platform comprising:
  means for capturing a series of images of a planar surface;
  means for comparing each image against a preceding image to determine a position of the mobile platform, wherein the means for comparing each image against the preceding image to determine the position of mobile platform comprises means for determining motion in real-time using Lucas-Kanade optical flow, and wherein the means for performing Lucas-Kanade optical flow is a means for performing a pyramidal Lucas-Kanade optical flow on a current image and the preceding image using multiple levels including a full resolution level and at least one partial resolution level, wherein the means for performing the pyramidal Lucas-Kanade optical flow comprises:
    means for determining a displacement between the current image and the preceding image to a nearest pixel in the at least one partial resolution level; and means for refining the displacement using subpixel displacements only at the full resolution level;

means for determining whether to perform drift correction by comparing each image to a keyframe image, wherein the keyframe image precedes the preceding image;

means for performing drift correction on the current image; and means for replacing the keyframe image with the current image;

wherein the means for comparing each image against the preceding image to determine the position of mobile platform comprises the means for determining motion in real-time using Lucas-Kanade optical flow.

20. A non-transitory computer-readable medium including program code stored thereon, comprising:

program code to compare each image in a received series of images of a planar surface against a preceding image to determine a position of a camera, wherein the program code to compare each image against the preceding image to determine the position of the camera comprises program code to determine motion in real-time using Lucas-Kanade optical flow, and wherein program code to determine motion in real-time using Lucas-Kanade optical flow comprises program code to perform a pyramidal Lucas-Kanade optical flow on a current image and the preceding image using multiple levels including a full resolution level and at least one partial resolution level, wherein program code to perform the pyramidal Lucas-Kanade optical flow comprises:

program code to determine a displacement between a first image frame and a second image frame to a nearest pixel in the at least one partial resolution level; and program code to refine the displacement using subpixel displacements only at the full resolution level;

program code to determine whether to perform drift correction by comparing each image to a keyframe image, wherein the keyframe image precedes the preceding image;

program code to perform drift correction on the current image; and program code to replace the keyframe image with the current image.

* * * * *